United States Patent [19]

Hoogland

[11] Patent Number: 4,946,267
[45] Date of Patent: Aug. 7, 1990

[54] ENDOSCOPE RELAY OPTICS

[76] Inventor: Jan Hoogland, 8982 N. Applegate Rd., Grants Pass, Oreg. 97527

[21] Appl. No.: 191,926

[22] Filed: May 9, 1988

[51] Int. Cl.$^5$ .......................... G02B 9/60; G02B 23/24
[52] U.S. Cl. ..................................... 350/465; 350/447; 350/573
[58] Field of Search ............... 350/573, 572, 465, 470, 350/432, 413, 414

[56] References Cited

U.S. PATENT DOCUMENTS

| | | |
|---|---|---|
| 2,346,062 | 0/1942 | Altman . |
| 2,519,760 | 0/1949 | Hett . |
| 2,571,308 | 0/1950 | Taylor . |
| 2,899,862 | 0/1956 | Baker . |
| 4,025,155 | 0/1977 | Imai . |
| 4,168,882 | 0/1979 | Hopkins . |
| 4,354,730 | 0/1982 | Bel . |
| 4,385,810 | 0/1983 | Hamou . |
| 4,545,652 | 0/1985 | Hoogland . |
| 4,575,192 | 0/1985 | Hoogland . |
| 4,621,910 | 11/1986 | Takahashi ........................... 350/465 |
| 4,676,606 | 6/1987 | Takahashi ........................... 350/573 |
| 4,693,568 | 9/1987 | Takahashi ........................... 350/469 |
| 4,783,154 | 11/1988 | Takahashi ........................... 350/413 |

OTHER PUBLICATIONS

Proceedings of the OSA; (Hoogland) International Lens Design Conference; SPIE vol. 237; Systematics of Photographic Lens Types; 1980.

Primary Examiner—Jon W. Henry
Attorney, Agent, or Firm—Townsend & Townsend

[57] ABSTRACT

An endoscope relay optics design that reduces the number of air surfaces while maintaining high levels of correction. A lens assembly for incorporation into an optical transfer system (where two such assemblies define an optical transfer module for transferring an image between successive image planes) is of unitary construction. The assembly comprises five elements including a central rod-like element of high index material, a pair of negative elements of relatively low index, high dispersion material cemented to opposite ends of the central element, and a pair of positive end elements of high index, low dispersion material cemented to the negative elements. The powers of the elements are determined by requiring the Petzval sum to assume a desired low value, with index difference being the primary contributor to the correction. The two exposed surfaces are flat or mildly concave and include an aspheric component to correct spherical aberration.

9 Claims, 3 Drawing Sheets

ENDOSCOPE RELAY OPTICS

FIELD OF THE INVENTION

The present invention relates generally to relay optics, and more specifically to endoscope relay optics

BACKGROUND OF THE INVENTION

U.S. Pat. No. 4,575,195, which is hereby incorporated by reference, discloses a series of endoscope relay optics characterized by the Petzval sum being corrected to a desired degree primarily by index difference, thereby avoiding any spaced high powered elements or sharply bent elements. Spherical aberration is corrected by providing aspheric surfaces on the exposed surfaces of negative plastic elements glued to positive glass elements. The design of the lenses discussed in the patent is very flexible and allows a high degree of correction so that the image quality at the eyepiece of the endoscope is high.

However, quality usually has its price, and the price in this case is a relatively large number of glass-air and plastic-air interfaces for most of the embodiments. Thus, while the lenses themselves are readily manufacturable in the sense of having relatively gentle surfaces, the cost of coating the large number of interfaces can be considerable.

SUMMARY OF THE INVENTION

The present invention provides an endoscope relay optics design that reduces the number of air surfaces while maintaining substantially the levels of correction that characterize the prior art endoscope optics referred to above.

A lens assembly for incorporation into an optical transfer system (where two such assemblies define an optical transfer module for transferring an image between successive image planes) is of unitary construction. The assembly comprises five elements including a central rod-like element of high index, low dispersion material (typically having convex or flat surfaces), a pair of negative elements of relatively low index, high dispersion material (concave-concave or plano-concave) cemented to opposite ends of the central element, and a pair of positive end elements of high index, low dispersion material (concave-convex or plano-convex) cemented to the negative elements.

The powers of the elements are determined by requiring the Petzval sum to assume a desired low value, with index difference being the primary contributor to the correction. The two exposed surfaces are flat or mildly concave and include an aspheric component to correct spherical aberration. The lenses are of symmetric configuration to correct coma, distortion, and lateral color, and the dispersions of the material are chosen to correct chromatic aberration.

The present invention thus achieves a high level of optical correction and improved manufacturability due to the absence of steep curves and the small number of air interfaces.

A further understanding of the nature and advantages of the present invention may be realized by reference to the remaining portions of the specification and the attached drawings.

DESCRIPTION OF THE PREFERRED EMBODIMENTS

Figure 1:
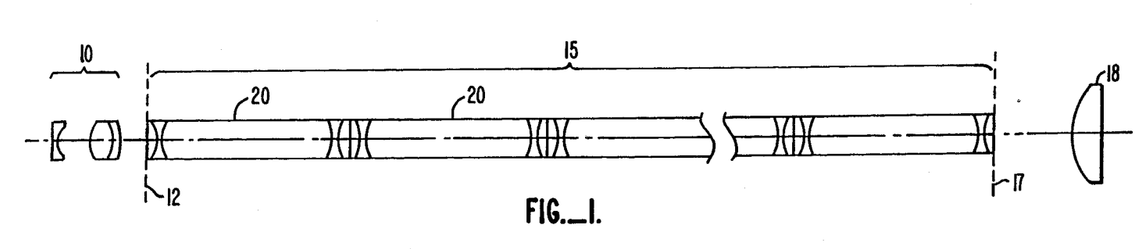
FIG. 1 is an optical schematic of an endoscope.

FIG. 1 is an optical schematic of an endoscope 5 in which the relay optics of the present invention may be incorporated. The system comprises an objective 10 for forming an image in a first image plane 12, a relay system 15 for transmitting an image in plane 12 to a second image plane 17, and an eyepiece 18 for viewing the transmitted image. Objective 10 and transfer system 15 occupy a relatively small diameter barrel which is typically surrounded by an annular fiberoptics bundle. A typical diameter of the lenses is about 2.5 mm.

In use, the endoscope is inserted within a body cavity or the like by a physician for viewing of internal body regions. Objective 10 forms an image of the region to be viewed at first image plane 12, which image is transmitted by relay system 15 to second image plane 17 proximate eyepiece 18 for direct viewing by the physician or communication to a television camera. In the various embodiments to be discussed below, relay system 15 comprises a plurality of cemented five-element assemblies 20. Assemblies 20 are arranged in pairs, with each pair providing a transfer module (i.e. a module which transfers an image from one plane at the front of the module to a second plane at the rear of the module).

FIGS. 2A-F are optical schematics of various embodiments of assemblies 20 illustrating the detailed construction thereof. A portion of a neighboring assembly is shown in phantom. In the preferred embodiment, assemblies 20 are all identical and symmetric from end to end. Assembly 20 includes a central rod-like element 22, first and second negative elements 25 separated by and cemented to central element 22, and first and second positive end elements 27 separated by the central and negative elements and cemented to the negative elements. In the first four embodiments, central element 22 has convex surfaces, negative elements 25 have concave surfaces, and positive end elements 27 are concave-convex. In the fifth embodiment, the end elements are plano-convex. In the sixth embodiment, the central element has flat surfaces, the negative elements are plano-concave, and the end elements are plano-convex.

The geometric characteristics of assembly 20 are defined by an entrance pupil plane 30a, a front surface 30b, a first cemented surface 30c, a second cemented surface 30d, a third cemented surface 30e, a fourth cemented surface 30f, a rear surface 30g, and an image plane 30h. It will be appreciated that entrance pupil plane 30a and image plane 30h would properly be referred to as an image plane and an exit pupil plane for the other assembly in the module.

The geometrical and optical parameters for the embodiments of FIGS. 2A-F are tabulated in Appendices 1A-F, and utilize the nomenclature wherein surfaces designated A-H correspond to plane 30a, surfaces 30b-g, and plane 30h. Units are in millimeters, it being understood that the actual lenses are much smaller. Although the values in the appendices provide an assembly length of about 200 mm, and a diameter of 30-35 mm, the actual lenses would be on the order of 10-15 times smaller. Front and rear surfaces 30b and 30g each has an aspheric component characterized by the conic constant k (equal to minus the square of the eccentricity) and aspheric coefficients AD, AE, AF, and AG.

For a surface having a base radius R (curvature $c=1/R$) and tangent to the x—y plane at the origin, the distance z from the x—y plane of a point (x,y) on the surface is given by the following equation:

$$z = \frac{c\rho^2}{1 + (1 - c^2(k + 1)\rho^2)^{\frac{1}{2}}} + AD\rho^4 + AE\rho^6 + AF\rho^8 + AG\rho^{10}$$

where $\rho^2 = x^2 + y^2$.

The general method of designing five-element assembly 20 may be outlined as follows. First, with the general configuration in mind, reasonable indices of refraction are determined from a choice of suitable materials. For example, negative elements 25 are formed of a flint glass having a relatively low index of refraction and high dispersion. End elements 27 are formed of a crown glass having low dispersion and high index. Central element 22 is preferably also formed of a crown glass having a high index and low dispersion. As the optical power of the central element is modest, this preference is not strong. The central element provides strength for the cemented assembly.

Having determined the indices of refraction, and further imposing the requirement that the assembly be symmetric, the powers of the individual elements are determined by requiring the Petzval sum to be reduced to a predetermined desired level and further requiring a given overall power. At this point, the choice of materials may be refined so that the dispersions can be chosen to correct chromatic aberration. Spherical aberration, coma, and astigmatism are not yet corrected. However, the provision of an aspheric surface on end elements 27 corrects spherical aberration, it being noted that with glass molding, it is no more difficult to provide an aspheric surface than a spherical surface. The stop location with respect to cemented surfaces 30c and 30d, together with the distribution between those surfaces is now chosen to correct astigmatism, while coma and distortion are corrected by utilizing a symmetric configuration with two identical axially aligned assemblies defining the transfer module.

The advantages of the design of assembly 20 may be seen. First, while each transfer module comprises ten elements, there are only three different elements, namely two identical central elements, four identical negative elements, and four identical end elements. Furthermore, as described above, the elements may be molded glass. Steep surfaces as are characteristic of sharply bent elements are avoided, and assembly of the overall system is simple.

Figure 2A:
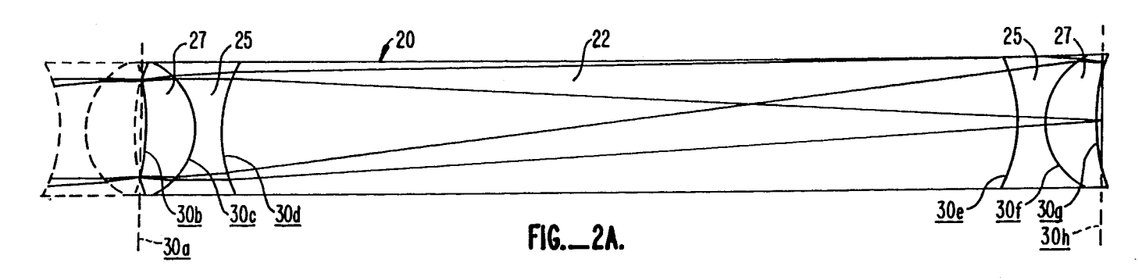
FIGS. 2A-F are optical schematics of various embodiments of an endoscope transfer lens assembly according to the present invention.
Figure 2B:
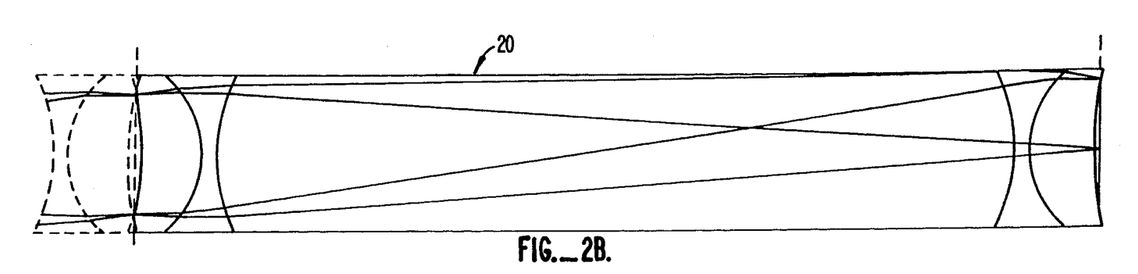
Figure 2C:
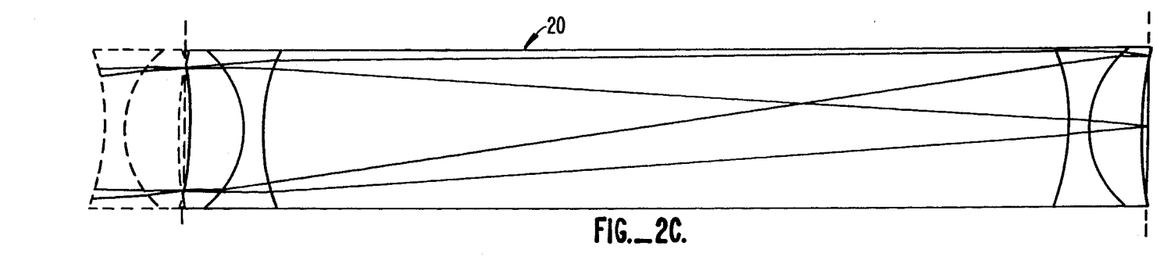
Figure 2D:
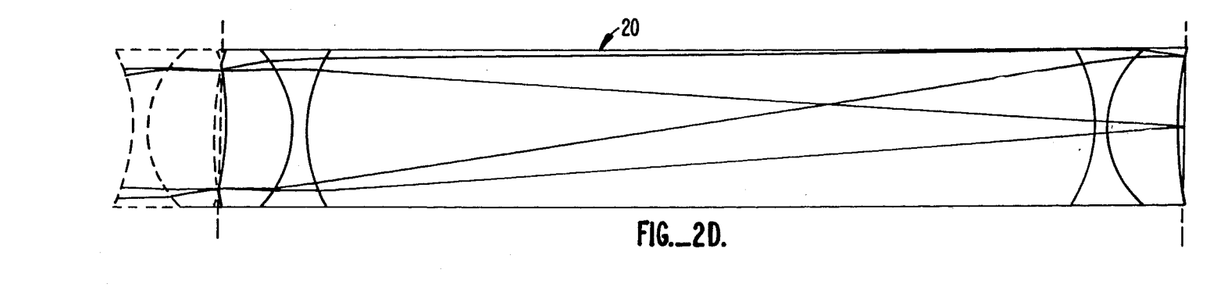
Figure 2E:
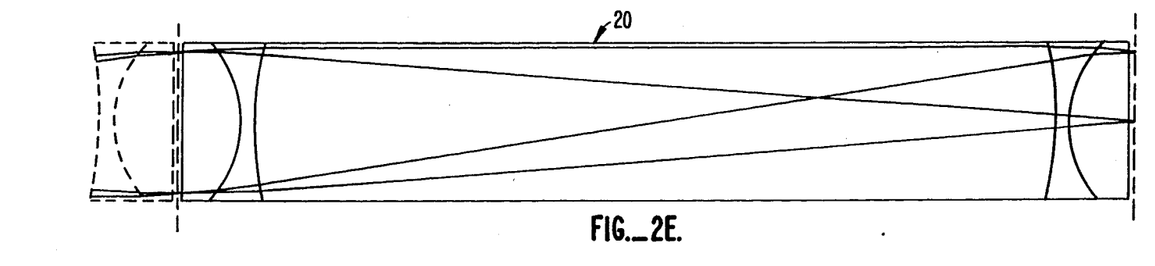
Figure 2F:
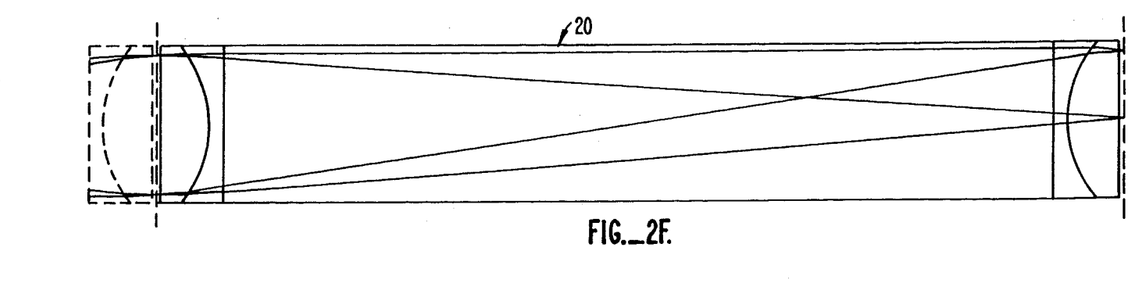

The embodiments of FIGS. 2B-E differ from that of FIG. 2A in that the high index material for the central element is not the same as that for the end elements. The embodiment of FIG. 2C further differs in that the negative elements are polycarbonate plastic rather than flint glass. The embodiment of FIG. 2D illustrates the use of very high index material for the end elements. The embodiment of FIG. 2E differs both in that the central element has a somewhat lower than usual index and in that the end surfaces are flat (but with an aspheric component). The embodiment of FIG. 2F is characterized by flat surfaces on the central element, the negative elements, and the end elements. Moreover, since there is no power at the surfaces of the central element, the central element can have high dispersion, thereby adding to the flexibility of the design.

In conclusion, it can be seen that the present invention provides design for relay optics that is characterized by high levels of correction, manufacturability, and flexibility. While the above gives a description of the preferred embodiments of the invention, various modifications, alternative constructions and equivalents may be employed without departing from the spirit of the invention. Therefore, the above description and illustrations should not be taken as limiting the scope of the invention which is defined by the appended claims.

| APPENDIX 1A (PETZVAL SUM = 0.22) | | | | | |
|---|---|---|---|---|---|
| SURFACE | RADIUS | THICKNESS | MEDIUM | INDEX | ABBE NO |
| A | — | | | | |
| | | 1.000 | Air | | |
| B | −63.111 | | | | |
| | | 10.602 | Schott LAF21 | 1.792 | 47.23 |
| C | −15.873 | | | | |
| | | 5.506 | Schott LF6 | 1.570 | 42.56 |
| D | 30.551 | | | | |
| | | 165.602 | Schott LAF21 | 1.792 | 47.23 |
| E | −30.551 | | | | |
| | | 5.506 | Schott LF6 | 1.570 | 42.56 |
| F | 15.873 | | | | |
| | | 10.602 | Schott LAF21 | 1.792 | 47.23 |
| G | 63.111 | | | | |
| | | 1.000 | Air | | |
| H | — | | | | |
| SURF | CONIC CONSTANT | AD | AE | AF | AG |
| B | 1.516 E + 01 | −3.126 E − 06 | −5.248 E − 09 | −1.507 E − 11 | 0.000 E + 00 |
| G | 1.516 E + 01 | 3.126 E −06 | 5.248 E − 09 | 1.507 E − 11 | 0.000 E + 00 |
| BF | F/NBR | OID | T-MAG | REF OBJ HT | REF AP HT |
| 1.008 | 4.00 | 399.643 | −1.000 | 0.125 E + 02 | 0.125 E + 02 |
| WAVL NBR | 1 | 2 | 3 | 4 | 5 |
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1B
(PETZVAL SUM = 0.71)

| SURFACE | RADIUS | THICKNESS | MEDIUM | INDEX | ABBE NO |
|---------|--------|-----------|--------|-------|---------|
| A | — | | | | |
| | | 1.000 | Air | | |
| B | 110.974 | | | | |
| | | 13.985 | Schott LASFN30 | 1.807 | 46.13 |
| C | −21.284 | | | | |
| | | 3.000 | Schott LF7 | 1.578 | 41.22 |
| D | 37.398 | | | | |
| | | 164.099 | Schott LAF21 | 1.792 | 47.23 |
| E | −37.398 | | | | |
| | | 3.000 | Schott LF7 | 1.578 | 41.22 |
| F | 21.284 | | | | |
| | | 13.985 | Schott LASFN30 | 1.807 | 46.13 |
| G | 110.974 | | | | |
| | | 1.000 | Air | | |
| H | — | | | | |

| SURF | CONIC CONSTANT | AD | AE | AF | AG |
|------|----------------|-----|-----|-----|-----|
| B | $1.849\,E+01$ | $-3.019\,E-06$ | $-3.764\,E-09$ | $-6.490\,E-12$ | $0.000\,E+00$ |
| G | $1.849\,E+01$ | $3.019\,E-06$ | $3.764\,E-09$ | $6.490\,E\,12$ | $0.000\,E+00$ |
| BF | F/NBR | OID | T-MAG | REF OBJ HT | REF AP HT |
| 1.017 | 3.33 | 400,1561 | −1.000000 | $0.150\,E+02$ | $0.150\,E+02$ |
| WAVL NBR | 1 | 2 | 3 | 4 | 5 |
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1C
(PETZVAL SUM = 0.80)

| SURFACE | RADIUS | THICKNESS | MEDIUM | INDEX | ABBE NO |
|---------|--------|-----------|--------|-------|---------|
| A | — | | | | |
| | | 1.000 | Air | | |
| B | −128.871 | | | | |
| | | 11.396 | Schott LASF3 | 1.813 | 40.36 |
| C | −21.742 | | | | |
| | | 4.000 | Polycarbonate | 1.590 | 29.62 |
| D | 46.858 | | | | |
| | | 167.394 | Schott SF57 | 1.855 | 23.64 |
| E | −46.858 | | | | |
| | | 4.000 | Polycarbonate | 1.590 | 29.62 |
| F | 21.742 | | | | |
| | | 11.396 | Schott LASF3 | 1.813 | 40.36 |
| G | 128.872 | | | | |
| | | 1.000 | Air | | |
| H | — | | | | |

| SURF | CONIC CONSTANT | AD | AE | AF | AG |
|------|----------------|-----|-----|-----|-----|
| B | $2.385\,E+01$ | $-2.563\,E-06$ | $-2.859\,E-09$ | $-4.520\,E-12$ | $0.000\,E+00$ |
| C | $2.385\,E+01$ | $2.563\,E-06$ | $2.859\,E-09$ | $4.520\,E-12$ | $0.000\,E+00$ |
| BF | F/NBR | OID | T-MAG | REF OBJ HT | REF AP HT |
| 1.022 | 3.33 | 400.3 51 | −1.000000 | $0.150\,E+02$ | $0.150\,E+02$ |
| WAVL NBR | 1 | 2 | 3 | 4 | 5 |
| WAVELENGTH | 0.54610 | 0.48000 | 0.64380 | 0.00000 | 0.00000 |
| SPECTRAL WT | 1.0000 | 1.0000 | 1.0000 | 1.0000 | 1.0000 |

APPENDIX 1D
(PETZVAL SUM = 0.60)

| SURFACE | RADIUS | THICKNESS | MEDIUM | INDEX | ABBE NO |
|---------|--------|-----------|--------|-------|---------|
| A | — | | | | |
| | | 1.000 | Air | | |
| B | −109.876 | | | | |
| | | 14.212 | Schott LASFN31 | 1.886 | 40.76 |
| C | −23.049 | | | | |
| | | 3.000 | Schott F5 | 1.607 | 37.76 |
| D | 35.968 | | | | |
| | | 163.663 | Schott LAF21 | 1.792 | 47.23 |
| E | −35.968 | | | | |
| | | 3.000 | Schott F5 | 1.607 | 37.76 |
| F | 23.049 | | | | |
| | | 14.212 | Schott LASFN31 | 1.886 | 40.76 |

-continued

APPENDIX 1D
(PETZVAL SUM = 0.60)

| | | | | | |
|---|---|---|---|---|---|
| G | 109.876 | | | | |
| | | 1.000 | Air | | |
| H | — | | | | |
| SURF | CONIC CONSTANT | AD | AE | AF | AG |
| B | 1.868 E + 01 | −2.400 E − 06 | −2.307 E − 09 | −3.133 E − 12 | 0.000 E + 00 |
| G | 1.868 E + 01 | 2.400 E − 06 | 2.307 E − 09 | 3.133 E − 12 | 0.000 E + 00 |
| BF | F/NBR | OID | T-MAG | REF OBJ HT | REF AP HT |
| 1.006 | 3.33 | 400.180 | −1.000 | 0.150 E + 02 | 0.150 E + 02 |
| WAVL NBR | 1 | 2 | 3 | 4 | 5 |
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1E
(PETZVAL SUM = 1.33)

| SURFACE | RADIUS | THICKNESS | MEDIUM | INDEX | ABBE NO |
|---|---|---|---|---|---|
| A | — | | | | |
| | | 1.000 | Air | | |
| B | flat | | | | |
| | | 12.327 | Schott LAFN24 | 1.761 | 47.57 |
| C | −24.819 | | | | |
| | | 3.000 | Schott LF7 | 1.578 | 41.22 |
| D | 79.030 | | | | |
| | | 166.990 | Schott LAK10 | 1.723 | 50.17 |
| E | −79.030 | | | | |
| | | 3.000 | Schott LF7 | 1.578 | 41.22 |
| F | 24.819 | | | | |
| | | 12.327 | Schott LAFN24 | 1.761 | 47.57 |
| G | flat | | | | |
| | | 1.000 | Air | | |
| H | — | | | | |
| SURF | CONIC CONSTANT | AD | AE | AF | AG |
| B | 0.000 E + 00 | −2.490 E − 06 | −2.162 E − 09 | −1.722 E − 12 | 0.000 E + 00 |
| G | 0.000 E + 00 | 2.490 E − 06 | 2.162 E − 09 | 1.722 E − 12 | 0.000 E + 00 |
| BF | F/NBR | OID | T-MAG | REF OBJ HT | REF AP HT |
| 1.0448 | 3.33 | 399.3333 | −1.000000 | 0.150 E + 02 | 0.150 E + 02 |
| WAVL NBR | 1 | 2 | 3 | 4 | 5 |
| WAVELENGTH | 0.54610 | 0.48000 | 0.64380 | 0.00000 | 0.00000 |
| SPECTRAL WT | 1.0000 | 1.0000 | 1.0000 | 1.0000 | 1.0000 |

APPENDIX 1F
(PETZVAL SUM = 1.34)

| SURFACE | RADIUS | THICKNESS | MEDIUM | INDEX | ABBE NO |
|---|---|---|---|---|---|
| A | — | | | | |
| | | 1.000 | Air | | |
| B | flat | | | | |
| | | 10.188 | Schott LASFN30 | 1.807 | 46.13 |
| C | −27.271 | | | | |
| | | 3.000 | Schott TIF3 | 1.551 | 41.89 |
| D | flat | | | | |
| | | 172.759 | Schott SF6 | 1.813 | 25.24 |
| E | flat | | | | |
| | | 3.000 | Schott TIF3 | 1.551 | 41.89 |
| F | 27.271 | | | | |
| | | 10.188 | Schott LASFN30 | 1.807 | 46.13 |
| G | flat | | | | |
| | | 1.000 | Air | | |
| H | — | | | | |
| SURF | CONIC CONSTANT | AD | AE | AF | AG |
| B | 0.000 E + 00 | −2.693 E − 06 | −1.757 E − 09 | −9.843 E − 13 | 0.000 E + 00 |
| G | 0.000 E + 00 | 2.693 E − 06 | 1.757 E − 09 | 9.843 E − 13 | 0.000 E + 00 |
| BF | F/NBR | OID | T-MAG | REF OBJ HT | REF AP HT |
| 1.0588 | 3.33 | 402.3318 | −1.000000 | 0.150 E + 02 | 0.150 E + 02 |
| WAVL NBR | 1 | 2 | 3 | 4 | 5 |
| WAVELENGTH | 0.54610 | 0.48000 | 0.64380 | 0.00000 | 0.00000 |

| -continued | | | | | |
|---|---|---|---|---|---|
| APPENDIX 1F (PETZVAL SUM = 1.34) | | | | | |
| SPECTRAL WT | 1.0000 | 1.0000 | 1.0000 | 1.0000 | 1.0000 |

I claim:

1. A lens assembly for incorporation into an optical transfer system wherein two such assemblies define an optical transfer module for transferring an image between successive image planes, comprising:
   a rod-like central element constructed of a first material having a relatively high index of refraction and having first and second end surfaces;
   first and second negative elements construed of a second material having a relatively low index of refraction, being axially spaced apart from each other by said central element and being cemented to said first and second end surfaces, respectively;
   first and second positive elements constructed of said first material, being spaced apart from each other by said central element and said negative elements and being cemented to said negative elements;
   the dispersions of said first and second materials being chosen to substantially correct chromatic aberration;
   the index difference contribution to the Petzval sum dominating the bending and spacing contributions to the Petzval sum.

2. The lens assembly of claim 1 wherein said positive elements are substantially identical, said negative elements are substantially identical, and said central element is substantially symmetric about a median plane, thereby substantially correcting coma, distortion, and lateral color.

3. The lens assembly of claim 1, wherein said central element has convex surfaces, said negative elements are concave-concave, and said positive elements are concave-convex.

4. A lens assembly for incorporation into an optical transfer system wherein two such assemblies define an optical transfer module for transferring an image between successive image planes, the lens assembly having normalized geometreical parameters and being made of optical materials as follows:

| SURFACE | RADIUS | THICKNESS | MEDIUM | INDEX | ABBE NO. |
|---|---|---|---|---|---|
| A | — | | | | |
| | | 1.000 | Air | | |
| B | −63.111 | | | | |
| | | 10.602 | Schott LAF21 | 1.792 | 47.23 |
| C | −15.873 | | | | |
| | | 5.506 | Schott LF6 | 1.570 | 42.56 |
| D | 30.551 | | | | |
| | | 165.602 | Schott LAF21 | 1.792 | 47.23 |
| E | −30.551 | | | | |
| | | 5.506 | Schott LF6 | 1.570 | 42.56 |
| F | 15.873 | | | | |
| | | 10.602 | Schott LAF21 | 1.792 | 47.23 |
| G | 63.111 | | | | |
| | | 1.000 | Air | | |
| H | — | | | | |

| SURF | CONIC CONSTANT | AD | AE | AF | AG |
|---|---|---|---|---|---|
| B | 1.516 E + 01 | −3.126 E − 06 | −5.248 E − 09 | −1.507 E − 11 | 0.000 E + 00 |
| G | 1.516 E + 01 | 3.126 E − 06 | 5.248 E − 09 | 1.507 E − 11 | 0.000 E + 00 |

5. A lens assembly for incorporation into an optical transfer system wherein two such assemblies define an optical transfer module for transferring an image between successive image planes, the lens assembly having normalized geometreical parameters and being made of optical materials as follows:

| SURFACE | RADIUS | THICKNESS | MEDIUM | INDEX | ABBE NO. |
|---|---|---|---|---|---|
| A | — | | | | |
| | | 1.000 | Air | | |
| B | 110.974 | | | | |
| | | 13.985 | Schott LASFN30 | 1.807 | 46.13 |
| C | −21.284 | | | | |
| | | 3.000 | Schott LF7 | 1.578 | 41.22 |
| D | 37.398 | | | | |
| | | 164.099 | Schott LAF21 | 1.792 | 47.23 |
| E | −37.398 | | | | |
| | | 3.000 | Schott LF7 | 1.578 | 41.22 |
| F | 21.284 | | | | |
| | | 13.985 | Schott LASFN30 | 1.807 | 46.13 |
| G | 110.974 | | | | |
| | | 1.000 | Air | | |
| H | — | | | | |

| SURF | CONIC CONSTANT | AD | AE | AF | AG |
|---|---|---|---|---|---|
| B | 1.849 E + 01 | −3.019 E − 06 | −3.764 E − 09 | −6.490 E − 12 | 0.000 E + 00 |

-continued

| | | | | | |
|---|---|---|---|---|---|
| G | 1.849 E + 01 | 3.019 E − 06 | 3.764 E − 09 | 6.490 E − 12 | 0.000 E + 00 |

6. A lens assembly for incorporation into an optical transfer system wherein two such assemblies define an optical transfer module for transferring an image between successive image planes, the lens assembly having normalized geometreical parameters and being made of optical materials as follows:

| SURFACE | RADIUS | THICKNESS | MEDIUM | INDEX | ABBE NO. |
|---|---|---|---|---|---|
| A | — | | | | |
| | | 1.000 | Air | | |
| B | −109.876 | | | | |
| | | 14.212 | Schott LASFN31 | 1.886 | 40.76 |
| C | −23.049 | | | | |
| | | 3.000 | Schott F5 | 1.607 | 37.76 |
| D | 35.968 | | | | |
| | | 163.663 | Schott LAF21 | 1.792 | 47.23 |
| E | −35.968 | | | | |
| | | 3.000 | Schott F5 | 1.607 | 37.76 |
| F | 23.049 | | | | |
| | | 14.212 | Schott LASFN31 | 1.886 | 40.76 |
| G | 109.876 | | | | |
| | | 1.000 | Air | | |
| H | — | | | | |

| SURF | CONIC CONSTANT | AD | AE | AF | AG |
|---|---|---|---|---|---|
| B | 1.868 E + 01 | −2.400 E − 06 | −2.307 E − 09 | −3.133 E − 12 | 0.000 E + 00 |
| C | 1.868 E + 01 | 2.400 E − 06 | 2.307 E − 09 | 3.133 E − 12 | 0.000 E + 00 |

7. A lens assembly for incorporation into an optical transfer system wherein two such assemblies define an optical transfer module for transferring an image between successive image planes, the lens assembly having normalized geometreical parameters and being made of optical materials as follows:

| SURFACE | RADIUS | THICKNESS | MEDIUM | INDEX | ABBE NO. |
|---|---|---|---|---|---|
| A | — | | | | |
| | | 1.000 | Air | | |
| B | −128.871 | | | | |
| | | 11.396 | Schott LASF3 | 1.813 | 40.36 |
| C | −21.742 | | | | |
| | | 4.000 | Polycarbonate | 1.590 | 29.62 |
| D | 46.858 | | | | |
| | | 167.394 | Schott SF57 | 1.855 | 23.64 |
| E | −46.858 | | | | |
| | | 4.000 | Polycarbonate | 1.590 | 29.62 |
| F | 21.742 | | | | |
| | | 11.396 | Schott LASF3 | 1.813 | 40.36 |
| G | 128.872 | | | | |
| | | 1.000 | Air | | |
| H | — | | | | |

| SURF | CONIC CONSTANT | AD | AE | AF | AG |
|---|---|---|---|---|---|
| B | 2.385 E + 01 | −2.563 E − 06 | −2.859 E − 09 | −4.520 E − 12 | 0.000 E + 00 |
| C | 2.385 E + 01 | 2.563 E − 06 | 2.859 E − 09 | 4.520 E − 12 | 0.000 E + 00 |

8. A lens assembly for incorporation into an optical transfer system wherein two such assemblies define an optical transfer module for transferring an image between successive image planes, the lens assembly having normalized geometreical parameters and being made of optical materials as follows:

| SURFACE | RADIUS | THICKNESS | MEDIUM | INDEX | ABBE NO. |
|---|---|---|---|---|---|
| A | — | | | | |
| | | 1.000 | Air | | |
| B | Flat | | | | |
| | | 12.327 | Schott LAFN24 | 1.761 | 47.57 |
| C | −24.819 | | | | |
| | | 3.000 | Schott LF7 | 1.578 | 41.22 |
| D | 79.030 | | | | |
| | | 166.990 | Schott LAK10 | 1.723 | 50.17 |
| E | −79.030 | | | | |
| | | 3.000 | Schott LF7 | 1.578 | 41.22 |
| F | 24.819 | | | | |
| | | 12.327 | Schott LAFN24 | 1.761 | 47.57 |
| G | Flat | | | | |
| | | 1.000 | Air | | |
| H | — | | | | |

-continued

| SURF | CONIC CONSTANT | AD | AE | AF | AG |
|---|---|---|---|---|---|
| B | 0.000 E + 00 | −2.2490 E − 06 | −2.162 E − 09 | −1.722 E − 12 | 0.000 E + 00 |
| G | 0.000 E + 00 | 2.490 E − 06 | 2.162 E − 09 | 1.722 E − 12 | 0.000 E + 00 |

9. A lens assembly for incorporation into an optical transfer system wherein two such assemblies define an optical transfer module for transferring an image between successive image planes, the lens assembly having normalized geometreical parameters and being made of optical materials as follows:

| SURFACE | RADIUS | THICKNESS | MEDIUM | INDEX | ABBE NO. |
|---|---|---|---|---|---|
| A | — | | | | |
| | | 1.000 | Air | | |
| B | Flat | | | | |
| | | 10.188 | Schott LASFN30 | 1.807 | 46.13 |
| C | −27.271 | | | | |
| | | 3.000 | Schott TIF3 | 1.551 | 41.89 |
| D | Flat | | | | |
| | | 172.759 | Schott SF6 | 1.813 | 25.24 |
| E | Flat | | | | |
| | | 3.000 | Schott TIF3 | 1.551 | 41.89 |
| F | 27.271 | | | | |
| | | 10.188 | Schott LASFN30 | 1.807 | 46.13 |
| G | Flat | | | | |
| | | 1.000 | Air | | |
| H | — | | | | |

| SURF | CONIC CONSTANT | AD | AE | AF | AG |
|---|---|---|---|---|---|
| B | 0.000 E + 00 | −2.693 E − 06 | −1.757 E − 09 | −9.843 E − 13 | 0.000 E + 00 |
| G | 0.000 E + 00 | 2.693 E − 06 | 1.757 E − 09 | 9.843 E − 13 | 0.000 E + 00 |

* * * * *